No. 704,195. Patented July 8, 1902.
H. G. JOHNSON.
GRINDING MILL.
(Application filed Nov. 1, 1901.)
(No Model.) 3 Sheets—Sheet 1.

Witnesses
Wm. J. Jacobi
Harry N. Wild

Inventor,
Hans G. Johnson,
By W. T. Fitzgerald
Attorney

No. 704,195. Patented July 8, 1902.
H. G. JOHNSON.
GRINDING MILL.
(Application filed Nov. 1, 1901.)

(No Model.) 3 Sheets—Sheet 2.

Witnesses
Wm. J. Jacobi
Harry W. Wild

Inventor
Hans G. Johnson.

By
W. T. Fitzgerald
Attorneys.

No. 704,195. Patented July 8, 1902.
H. G. JOHNSON.
GRINDING MILL.
(Application filed Nov. 1, 1901.)
(No Model.) 3 Sheets—Sheet 3.

Witnesses

Inventor
Hans G. Johnson.

UNITED STATES PATENT OFFICE.

HANS G. JOHNSON, OF WAUKON, IOWA, ASSIGNOR OF ONE-HALF TO THEODORE SCHULTE, OF WAUKON, IOWA.

GRINDING-MILL.

SPECIFICATION forming part of Letters Patent No. 704,195, dated July 8, 1902.

Application filed November 1, 1901. Serial No. 80,785. (No model.)

*To all whom it may concern:*

Be it known that I, HANS G. JOHNSON, a citizen of the United States, residing at Waukon, in the county of Allamakee and State of Iowa, have invented certain new and useful Improvements in Grinding-Mills; and I do hereby declare the following to be a full, clear, and exact description of the invention, such as will enable others skilled in the art to which it appertains to make and use the same.

My invention relates to grinding-machines, and more particularly to a mill which is especially designed and adapted to be driven by a windmill or similar source of power.

The object of my invention is to provide a mill of very simple, cheap, and efficient construction which will enable the farmer and others to grind any variety of grain and fit it for use as food, though my improved mill may be said to be especially designed for coarsely grinding or breaking the grains of corn and fitting it as more desirable stock food.

With the foregoing and other objects in view I have provided certain combination and construction of parts, as will be hereinafter fully described and claimed, reference being had to the accompanying drawings, in which—

Figure 1:
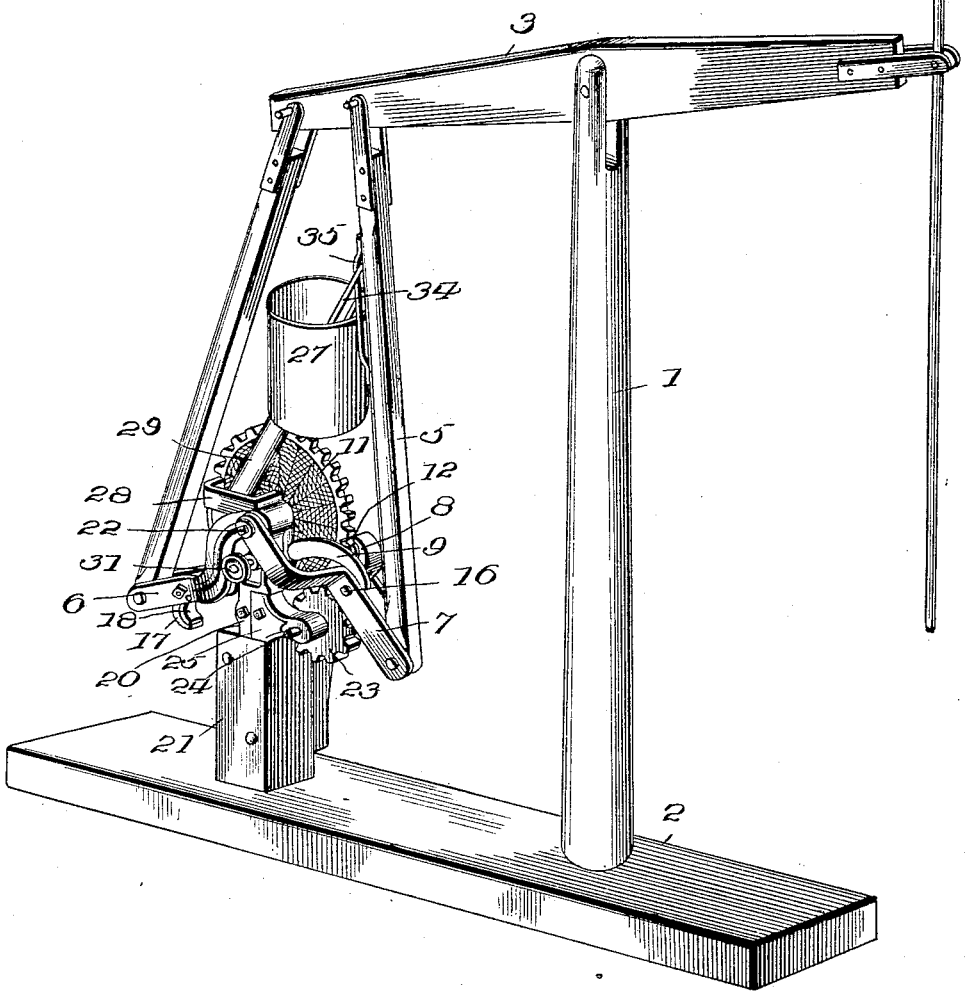
Figure 2:
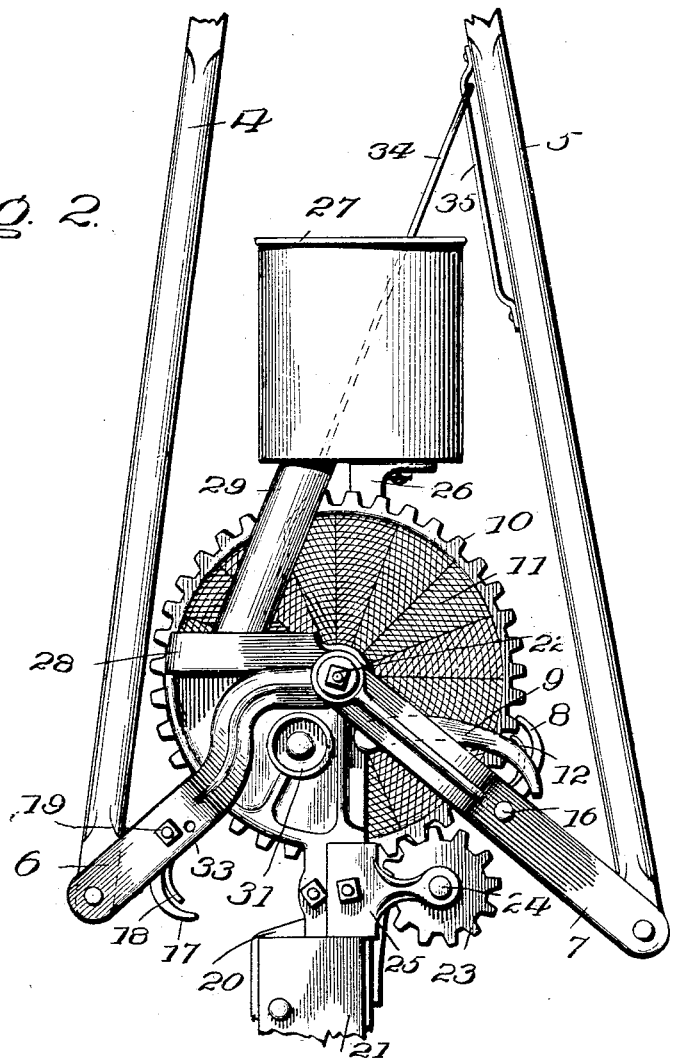
Figure 5:
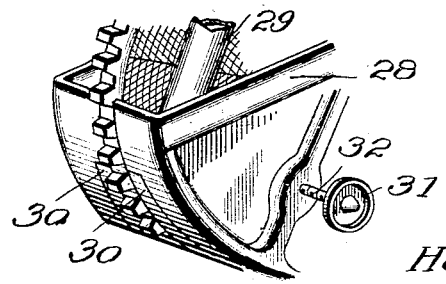
Figures 3, 4:
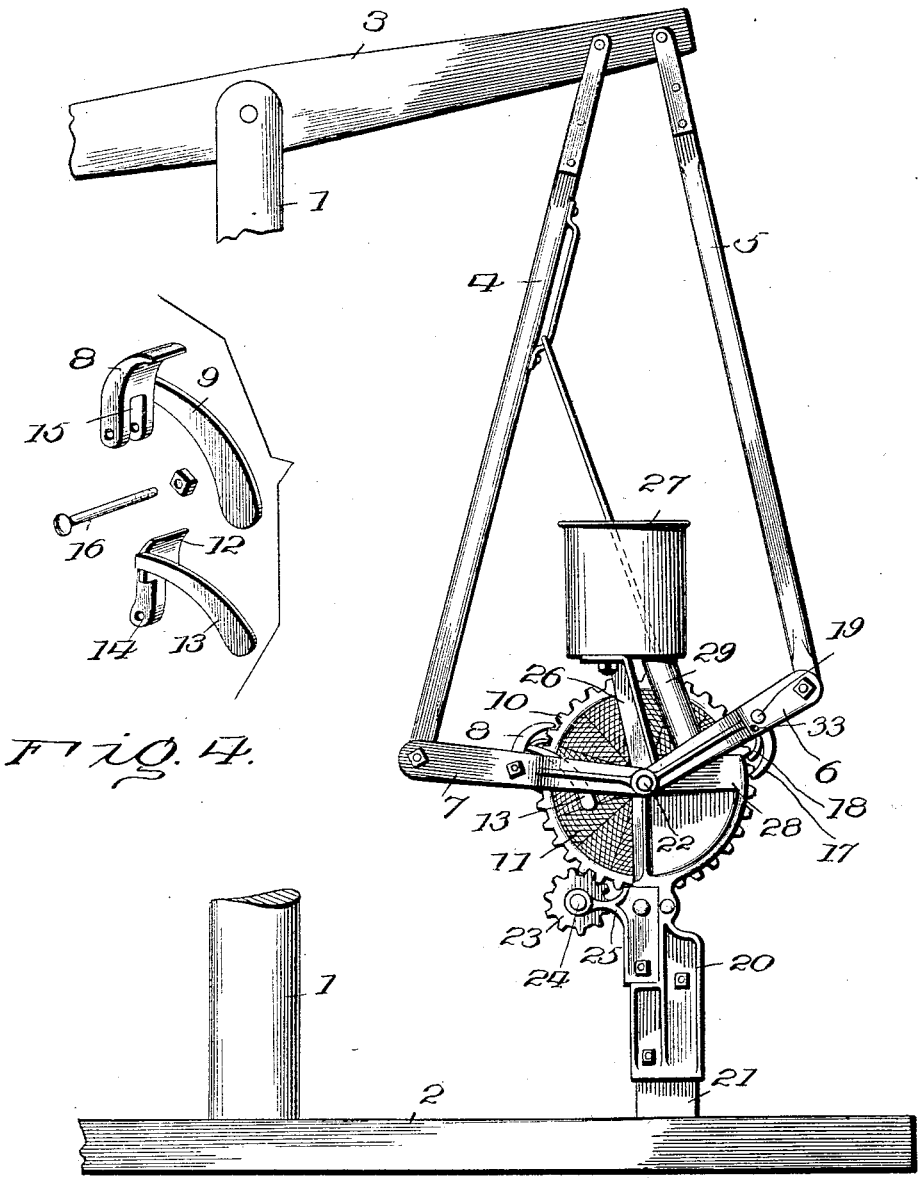

Figure 1 is a perspective view of my invention complete ready for use, showing the manner of connecting the same to the power afforded by a windmill. Fig. 2 is a side elevation of my improved mill. Fig. 3 is a side elevation thereof, taken from the opposite side from that shown in Fig. 2. Fig. 4 is a detail in perspective of the preferred form of pawls or detents employed by me to coöperate with the driving-lever. Fig. 5 is a perspective detail view, on a slightly-enlarged scale, of a portion of my improved mill, showing the manner of regulating the action of the mill, whereby the grain will be ground finely or coarsely, as desired.

Referring to the numerals upon the drawings, which are employed to designate the various features of my invention and coöperating accessories, 1 indicates a suitable form of post which is disposed in an upright manner, as by connecting the same to the base-section 2, though said post, if desired, may be entered directly into the surface of the ground or may extend through the floor of a building, it being understood that my object is to firmly secure said post in order that it will reliably hold the walking-beam 3 suitably pivoted at its inner portion to the upper end of the post and operatively connected in any preferred way to the pump-rod or other source of power. To the opposite end of the walking-beam I pivotally connect the connecting-rods or link-sections 4 and 5, each extending downward into pivotal engagement with its respective lever. It will therefore be observed in the drawings that the rod 5 is connected with the lever 7, while the rod 4 is similarly connected to the lever 6, thereby insuring that said levers will both be raised and lowered simultaneously.

I prefer to form the lever 7 so that it will be of greater length than the lever 6 in order to compensate for the fact that the driving-piston 4 is connected to the walking-beam 3 in such a manner that it will not be moved as far as the lever 5, as will be obvious. The driving-lever 7 is provided with the detent 8, having an integral counterpoise 9, in order to insure that said detent will always be disposed in engagement with the teeth 10 of the grinding wheel or disk 11.

Designed to coöperate with the detent 8 is the auxiliary detent 12, also provided with an integral counterpoise 13 and having an apertured end 14, designed to be received by the slot or recess 15 in the lower end of the detent 8, said detent 12 being secured in coöperation with the detent 8 by means of the bolt 16, which extends through a suitable aperture in the driving-lever 7.

Inasmuch as detents 17 and 18 are not the same in length, one or the other will catch a tooth, and thus avoid any lost motion. The same is true with respect to the opposite set of detents. The lever 6 is provided with the downwardly-directed detent 17 and with the coöperating auxiliary detent 18, pivotally connected to said lever 6 by the bolt 19 in a similar manner to the arrangement just described for the detents 8 and 12. It may be stated at this time that the grinding-wheel 11 is rotatably mounted upon the upper end of the standard 20, which latter is firmly secured in position in any preferred way, as upon the post or other similar support 21. The standard 20 is bifurcated at its upper end, so as to provide a seat for the grinding-wheel, and in order to mount the driving-levers 6 and 7 in a reliably efficient manner I prefer to bifurcate the inner ends thereof, as indicated in Fig. 1, and dispose one branch upon either side of the bifurcated standard and secure the same pivotally to the protruding ends of the journals or axle 22, carried by the grinding-wheel. By thus bifurcating the inner ends of the levers 6 and 7 I am enabled to conveniently and reliably dispose the detents carried by said levers in such position that they will operatively engage the peripheral face of the grinding-wheel carrying the plurality of notches or teeth 10.

I prefer to form the teeth 10 so that they will be substantially in the form of cogs in order that said cogs may mesh with the cog-wheel 23, operatively mounted upon the shaft 24, which latter is operatively seated in the bracket 25, attached to a contiguous part of the standard 20. It is obvious that the shaft 24 may be extended outward upon either side and have attached thereto any desired form of pulley-wheel or other device by which power may be communicated to other machinery, or if rotary power can be obtained the mill can be driven from the pinion and the levers not used. Therefore it is obvious that the mill can be operated by any form of power.

Mounted upon the upper end of the standard 21 and secured thereto in any preferred way or formed integral therewith are a pair of standards 26, one of said standards being disposed upon either side of the grinding-wheel, while upon the upper end of said standards thus or otherwise disposed I mount the hopper 27, in which may be disposed the corn or other grain to be ground. It may also be stated at this time that the auxiliary hopper 28 is provided upon each side of the grinding-wheel, said hopper being formed integral with or comprising an extension or an enlargement of a portion of the bifurcated end of the standard 20, said auxiliary hoppers 28 being designed to receive the lower end of the conveyer-tubes 29, extending from the hopper and conveying the grain downward into engagement with the grinding-wheel.

By reference to Fig. 5 it will be observed that means are provided whereby the grain may be coarsely or finely ground, said means comprising the adjustable plate 30, properly seated in a suitable recess in the auxiliary hopper 28 and rendered adjustable by the controlling-wheel 31, provided with a threaded shaft 32, which extends through a suitable aperture in the wall of the auxiliary hopper and adapted at its inner end to bear against the outer face of the plate 30 and hold the same tightly or loosely in engagement with the face of the grinding-wheel, as may be desired. It will be understood that the inner face or that portion of the plate 30 contiguous to the grinding-wheel is properly roughened or corrugated in order to complement the co-operating grinding-face of the wheel 11.

When it is desired to coarsely grind the grain, the wheel 31 is turned to the left, thus removing the pressure of the end of the threaded shaft 32 against the contiguous part of the plate 30, as will be readily understood.

In Fig. 5 I have illustrated the position of both these plates, it being understood that various modifications and substitutes in construction may be adopted, as desired, in order to fit the machine for the performance of all varieties of work.

By reference to Figs. 1 and 3 it will be observed that the arrangement of the parts is made with a view to accommodating the peculiar movement of the shaft of the windmill—that is to say, provision is made for throwing the detents 17 and 18 entirely out of engagement with the teeth upon the wheel 11 by inserting a rod through the aperture 33, which rod will prevent the inward movement of the ends of the detents 17 and 18, and thereby throw all of the work upon the lever 7 and the detents 8 and 12. When, however, the operation of pumping has been completed and it is desired to apply the power of the wind-motor solely to the work of driving my mill, I will withdraw the pin from the aperture 32, and thereby release the detents 17 and 18 and permit both levers 6 and 7 to operate in the performance of their office, and the result will be that the wheel 11 will be continuously moved either by the up or the down stroke of said lever.

In order that the contents of the hopper 27 may be thoroughly agitated, and thereby prevent clogging of the grain and its consequent failure to pass downward through the tubes or chutes 29, I provide the agitating shafts or rods 34, which may consist of a single piece of wire bent upon itself and extended through or under the metal strap 35, carried by one of the connecting-rods 4 or 5.

I preferably secure the guiding bracket or strap 35 to the connecting-rod 5 in view of the inclination of the chutes 29. The lower ends of the rods 34 are preferably slightly corrugated, as indicated by the dotted lines in Fig. 2, in order to insure a more perfect agitation of the contents of the chutes.

It is obvious that the rods 34 could not be merely pivotally connected to the connecting-rod 5, and for such reason I provide the strap or bracket 35 in order to compensate for the change of position of said lever. In the present instance I have shown but one of the standards or brackets 26, though, as above set forth, two of said standards may be provided, if desired, one upon either side of the grinding-wheel 11.

As above set forth, both sides of the wheel 11 may be properly milled or roughened in order to secure a proper result, it being understood that said wheel is preferably formed of hardened steel, though other material may be used.

The wheel 23 is preferably so made that its face will be much wider than the face of the wheel 11, thus enabling the said wheel 23 to be laterally adjusted in order to compensate for undue wear caused by the wheel 11 in case said wheel 11 is made of harder material than that employed for the wheel 23.

I desire to comprehend in this application all substantial equivalents and substitutes that may be considered to fall fairly within the scope of my invention, inasmuch as various changes and modifications may be adopted without departing from the spirit of my invention.

My mill may be very cheaply made and supplied to farmers and others desiring to utilize the cheap motive power of a windmill or the equivalents, inasmuch as my mill can be operated, as above explained, solely upon the downward stroke of the pump-rod without encumbering the pumping operation with the work of driving the mill upon the upward stroke of said rod or from the pinion 23 by belt, chain, rope, or tumbling-rod.

Having thus fully described my invention, what I claim as new, and desire to secure by Letters Patent, is—

In a mill of the character specified, a suitable grinding disk or wheel having a milled surface upon both sides and a toothed periphery; suitable means to rotatably mount said wheel; a pair of levers 6 and 7 carrying a detent designed to engage the periphery of said grinding-wheel; connecting-rods operatively connected to the lower end of said levers and a walking-beam pivotally connected to the upper end thereof; a hopper and grain-agitating devices carried by the hopper and connected to one of said rods whereby the contents of the hopper will be agitated and prevented from clogging, and means intermediate the hopper and the grinding-wheel to deliver the grain to the latter, all substantially as specified and for the purpose set forth.

In testimony whereof I affix my signature in presence of two witnesses.

HANS G. JOHNSON.

Witnesses:
   CHAS. E. STILWELL,
   C. S. STILWELL.